(12) United States Patent
Cheng et al.

(10) Patent No.: US 6,517,800 B1
(45) Date of Patent: Feb. 11, 2003

(54) PRODUCTION OF SINGLE-WALLED CARBON NANOTUBES BY A HYDROGEN ARC DISCHARGE METHOD

(75) Inventors: Huiming Cheng, Shenyang (CN); Chang Liu, Shenyang (CN); Hongtao Cong, Shenyang (CN); Min Liu, Shenyang (CN); Yueying Fan, Shenyang (CN); Ge Su, Shenyang (CN)

(73) Assignee: Institute of Metal Research of The Chinese Academy of Sciences, Shenyang (CN)

( * ) Notice: Subject to any disclaimer, the term of this patent is extended or adjusted under 35 U.S.C. 154(b) by 0 days.

(21) Appl. No.: 09/588,568

(22) Filed: Jun. 7, 2000

(30) Foreign Application Priority Data

Jun. 16, 1999 (CN) .......................................... 99113022

(51) Int. Cl.[7] .................................................. D01F 9/12
(52) U.S. Cl. .................................. 423/447.1; 423/447.7
(58) Field of Search .......................... 423/445 B, 447.1, 423/447.7

(56) References Cited

U.S. PATENT DOCUMENTS

| | | | | |
|---|---|---|---|---|
| 5,281,274 A | * | 1/1994 | Yoder ........................... | 118/697 |
| 5,653,951 A | | 8/1997 | Rodriguez et al. .......... | 423/439 |
| 6,149,775 A | * | 11/2000 | Tsuboi et al. ................ | 204/173 |

\* cited by examiner

*Primary Examiner*—Stuart L. Hendrickson
(74) *Attorney, Agent, or Firm*—Smith, Gambrell & Russell, LLP

(57) ABSTRACT

A method for producing a single-walled carbon nanotube product by a hydrogen arc discharge method includes providing an anode including graphite powder, catalyst metal, and a growth promoter in an atmosphere containing hydrogen; providing a cathode in the atmosphere; and inducing an electric arc across the anode and cathode to thereby consume the anode and produce the single-walled carbon nanotube product. Additionally, the single-walled carbon nanotube product may be soaked in an acid or an oxidative reactant and heated under vacuum to produce a hydrogen storage material.

18 Claims, 3 Drawing Sheets

PRODUCTION OF SINGLE-WALLED CARBON NANOTUBES BY A HYDROGEN ARC DISCHARGE METHOD

FIELD OF THE INVENTION

The present invention relates to a large-scale hydrogen arc discharge method for the synthesis of single-walled carbon nanotubes ("SWNTs"). Under an atmosphere of $H_2$, a large-size anode composed of graphite powders, catalyst metals and growth promoter is consumed with the growth of SWNTs. The angle between the anode and cathode can be adjusted in the range of 30°~80°. The catalysts used can be two or more kinds of metals selected from Fe, Co, Ni and Y, which have proven to be essential for the growth of SWNTs. The proportion of catalysts is modified in the range of 2.5~5.0 at %. By these processes, large-scale SWNTs with a large diameter can be synthesized with the advantages of semi-continuous synthesis, low cost and high quality, and the SWNTs obtained can then be employed as a kind of promising hydrogen storage material.

BACKGROUND OF THE INVENTION

To eliminate the gasoline shortage and environmental pollution produced by automobiles, various technologies are being developed to replace the gasoline-powered internal combustion engine. Among the alternative fuel technologies, the hydrogen fuel cell is believed to be ideal because of its advantages of renewable and non-pollution performance. For the purpose of identifying the practicability of the fuel cell powered vehicle, the United States Department of Energy ("D.O.E.") has issued energy density goals for vehicular hydrogen storage: 6.5 wt % $H_2$ or 62 kg $H_2/m^3$, which indicates that the identified fuel cell can provide a 350 mile range driving in a vehicle.

Compared to all the other hydrogen storage systems, such as liquid hydrogen systems, compressed hydrogen systems, metal hydride systems and super active carbon systems, carbon nanotube systems, especially single-walled carbon nanotubes (SWNTs) are expected to be utmost close to the D.O.E. energy density goals and can be made into an ideal hydrogen storage system, which needs to be light, compact, relatively inexpensive, safe, easy to use and reusable without the need for regeneration.

The most widely used method to produce SWNTs is the electric arc discharge method, which was first employed by S. Iijima and Bethune in 1993. However, the purity of the products they obtained was very poor, so that the characterization and utilization of SWNTs were limited to a great extent. In 1997, C. Journet et al obtained SWNTs with higher yield and purity through the optimization of synthesis parameters. The main characteristics of their method include: use of He at 660 torr as a buffer gas, use of two graphite rods as electrodes, and the size of the electrodes were: anode—Φ 16×40 mm, cathode—Φ 16×100 mm, and a Φ 3.5×40 mm pore was drilled along with the axis of the anode to fill with a mixture of graphite powders and catalysts (Y, Ni). The anode and the cathode were perpendicular with each other. The morphologies of the products can be classified as follows: (1) Rubbery soot formed on the internal wall of the reactor; (2) Web-like substance between the cathode and reactor wall; (3) Cylinder deposit on the tip of the cathode; and (4) Porous, light, hoop-like substance formed around the cylinder deposit. From then on, no remarkable progress happened with respect to the electric arc discharge method. Although the obtained SWNTs have nearly defect-free microstructure, the traditional electric arc discharge method is difficult to apply to commercial or large-scale synthesis because of its shortcomings: i.e., the yield is limited by the size of electrodes and the reactor; the producing process is un-continuous; and the content of impurities such as amorphous carbon is high.

Since SWNTs have aroused a great deal of interest from the fundamental viewpoint as well as for potential applications, enormous high-quality SWNTs are demanded for both research and commercial purposes. Consequently, there is an urgent need for a new method which can produce SWNTs in a semi-continuous or continuous synthesis in large-scale, high quality and low cost.

SUMMARY OF THE INVENTION

In accordance with the present invention, there is a hydrogen arc discharge method provided for the production of SWNTs with high hydrogen storage capacity. The main characteristics or parameters of the method include:

(a) Large-scale SWNTs are produced with: (i) graphite powders, (ii) catalyst metals selected from Fe, Co, Ni, Y, (iii) sulfur or solid sulfide as a growth promoter, and (iv) $H_2$ at a pressure of 50~400 torr as a buffer gas. After being evenly dispersed, the reactants are filled into holes provided on the upper surface of a large anode or mold-pressed into targets as the anode, and the anode will be consumed with the growth of SWNTs under the atmosphere of $H_2$; and (b) The obtained SWNTs are (i) soaked in acids or oxidative reactants, (ii) heated in vacuum, or (iii) through a combined pre-treatment of (i) and (ii), to prepare high-capacity hydrogen storage materials.

In preferred embodiments of the present invention, the diameter of the anode is about 10~20 times larger than that of the cathode, so that the synthesis time is enlonged to produce large-scale SWNTs.

In other preferred embodiments of the present invention, the angle between the anode and the cathode can be adjusted from 30° to 80°. By changing the angle, the quality and morphology of the products can be changed.

In still other preferred embodiments of the present invention, argon (no more than 20 vol %) can be mixed into the $H_2$ as a buffer gas.

In yet other preferred embodiments of the present invention, the pre-treatment techniques for the SWNTs may include: (a) soaking in (i) $HNO_3$ acid (20~65%), (ii) HCl acid (10~37%) or (iii) oxidative reactants, (b) vacuum heating at 400~900° C. or (c) the combination of (a) and (b).

DETAILED DESCRIPTION OF THE INVENTION

Figure 1:
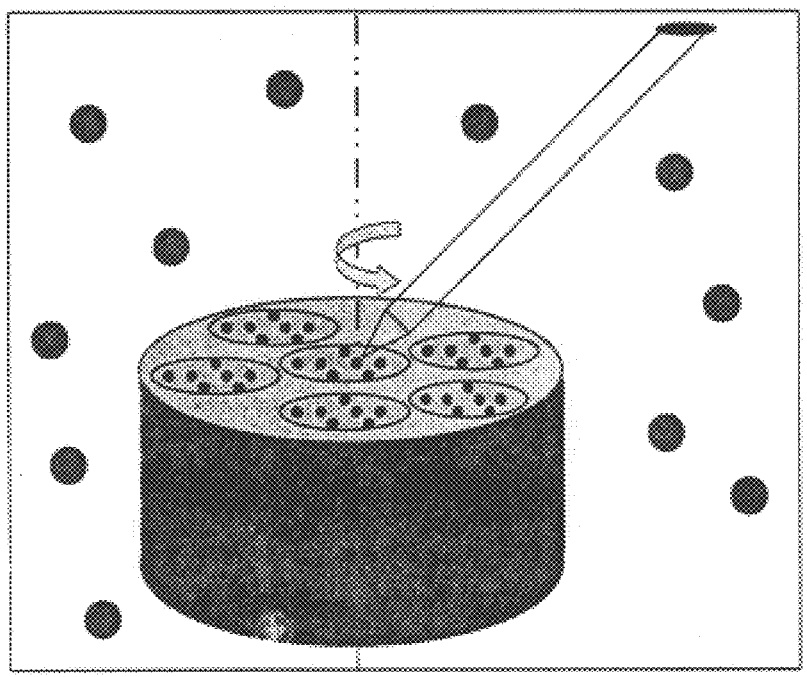
FIG. 1 is a schematic diagram of the apparatus used for synthesizing SWNTs in large scale by a semi-continuous hydrogen arc discharge method (in this apparatus, several holes are drilled on the upper surface of the big cylinder anode to fill in with reactants)

In a stainless shell, copper-lined large-size reactor, an electric arc discharge is generated between the electrodes under an atmosphere of $H_2$ or a mixture of $H_2$ and Ar. The anode is a graphite cylinder ($\Phi 400 \times 35$ mm) on whose upper surface several holes ($\Phi 10 \times 15$ mm) are drilled to fill in with the reactants, or a reactants cylinder target ($\Phi 400 \times 35$ mm) is prepared by model-pressing. The anode is then placed onto a rotatable disc. The cathode is a graphite rod ($\Phi 10$ mm) that can be moved toward the anode such that a distance of about 2 mm remains between them. Typically, the anode diameter is larger than the cathode diameter, wherein the ratio of the anode diameter to the cathode diameter is 10~20.

The reactants are weighed individually and then evenly dispersed in an alcohol solution. After having been dried, the reactants are filled into the holes on the upper surface of the anode, or the reactants are model-pressed into a cylinder target to be used directly as the anode (e.g., the reactants may be model-pressed under a pressure of ~10 MPa).

Under an atmosphere of $H_2$, a current (100~150 A, DC) is passed through the electrodes to create a plasma. By the effect of high temperature, the reactants are co-evaporated to synthesize SWNTs. With the co-evaporation of the reactants, the cathode is continuously translated to keep a constant distance between the electrodes. After the reactants in one hole (or one part of the target) are consumed, the synthesis process is stopped, and the disc under the anode is rotated properly to sublimate the reactants in the next hole (or the next part of the target). At the same time, taking into account the consumption of $H_2$, the buffer gas is pumped out and re-filled in the interval. The typical reaction time is 3 minutes.

Pure hydrogen gas ($H_2$) may be used in this process. In some processes, however, Ar (no more than 20 vol %) is incorporated with the $H_2$ to be employed as the buffer gas.

In order to improve the yield and quality of the products, as compared to the traditional electric arc discharge method, some innovation to the apparatus and optimization to the reactants are employed in the present invention.

Compared with traditional buffer gas—He, the price of $H_2$ is much cheaper, so that the synthesis cost can be lowered by the usage of $H_2$. At the same time, some intrinsic characteristics of hydrogen are beneficial to the growth of SWNTs: high conductivity is helpful to cool down the plasma rapidly and create a high temperature gradient to improve the growth of SWNTs; hydrogen can selectively corrode amorphous carbon impurities and thereby improve the purity of the products; hydrogen can promote the vaporization of metal catalysts and prevent the catalysts from being poisoned.

In order to prepare SWNTs at high yield, the synthesis apparatus is also innovated. The reactor is cylindrical shaped (at least $\Phi 600 \times 400$ mm), and the electrodes are not vertically opposite but make an oblique angle (30°~80°), which are beneficial to preparing SWNTs in large scale. In our comparative experiments, no evident differences in the yield of products were observed when the angle was adjusted (as an instance, see examples 1 and 2), but a suitable angle can accelerate the flowing of the plasma and then is considered to be helpful to synthesize SWNTs in large scale. In most examples of the present invention, the angle between the anode and cathode is selected to be 50°.

Moreover, the reactants were mixed evenly and filled into the holes on the upper surface of the anode cylinder to co-evaporate graphite powders and catalysts more homogeneously. The rotatable anode makes this synthesis process a semi-continuous or continuous one. The system is more convenient to operate when the reactants are compressed into the shape of a cylinder and then used as a raw material target.

The application of a sulfur-containing promoter is essential to the present invention (e.g., in an amount of 0.5 to 1 atom percent). Without the sulfur-containing prompter, SWNTs are barely obtained. When a proper sulfur-containing promoter is employed, this invention is capable of producing large-scale, high quality SWNTs.

There are mainly three kinds of products obtained: (a) web-like substances; (b) aligned SWNT ropes that hang between the cathode and the upper chamber wall; and (c) thin films formed on the upper chamber wall, which can be peeled off in large slices (~200 cm²), and are self-fluttering, self-adhering to hands and vessels. The existing change in the form of the products may be attributed to the different opposite orientations of the electrodes, which lead to different ways that the plasma flows.

To obtain a high-capacity hydrogen storage material, the as-prepared SWNTs are soaked in acids such as $HNO_3$ (20~65%) or HCl (10~37%) and then heat-treated in vacuum for 2~4 hours. The soaking may last for 24 to 48 hours, and the heat treatment may be at a temperature from 400° C. to 1200° C. The results of hydrogen absorption experiments based on the pretreated SWNTs indicate that the hydrogen storage capacity of the SWNTs is higher than 3% by weight, and typically about 3~5 wt % at moderate high pressure and room temperature, and the hydrogen storage capacity of the SWNTs can be further improved if the quality is improved and the pre-treatment parameters are optimized.

In brief, in this invention, hydrogen, rather than helium, was selected as the buffer gas, so that high-quality SWNTs can be synthesized at low cost. The synthesis apparatus is innovated to realize a semi-continuous synthesis process, and the yield can be high. Because the diameter of the SWNTs obtained is large (mean value: 1.85 nm), they can uptake a large amount of hydrogen at room temperature. The hydrogen storage capacity of SWNTs is further improved by acid soaking and heat treatment, and the hydrogen storage capacity is measured to be 3~5 wt %. Through this hydrogen arc discharge method, SWNTs can be prepared with the advantages of semi continuity, low cost, large scale and high quality. The processes of acid soaking and heat treatment give high hydrogen storage capacity of SWNTs, which indicates that SWNTs are a promising candidate for hydrogen storage.

The present invention will be illustrated in more detail with reference to the following examples, which should not be construed to be limiting in scope of the present invention.

EXAMPLE 1

The apparatus used is shown in FIG. 1.

2.0 g of reactants containing 2.6 at % Ni, 0.7 at % Fe, 0.7 at % Co, 0.75 at % FeS and 95.25 at % graphite powder were filled into a hole on the upper surface of the anode cylinder. The angle between the anode and the cathode was modified to 40°. The electric arc was operated under an atmosphere of $H_2$ using 150 A, dc. The distance between the electrodes remained ~2 mm, and the reaction time was typically 3 minutes. The product obtained was a rope-like, film-like and web-like substance with a total weight of 185 mg.

EXAMPLE 2

The apparatus used is shown in FIG. 1.

2.0 g of reactants containing 2.6 at % Ni, 0.7 at % Fe, 0.7 at % Co, 0.75 at % FeS and 95.25 at % graphite powder were filled into a hole on the upper surface of the anode cylinder. The angle between the anode and the cathode was modified to 70°. The electric arc was operated under an atmosphere of $H_2$ using 150 A, dc. The distance between the electrodes remained ~2 mm, and the reaction time was typically 3 minutes. The product obtained was a rope-like, film-like and web-like substance with a total weight of 180 mg.

EXAMPLE 3

The apparatus used is as shown in FIG. 1.

2.0 g of reactants containing 2.6 at % Ni, 1.0 at % Co, 0.75 at % FeS and 95.65 at % graphite powder were filled into a hole on the upper surface of the anode cylinder. The angle between the anode and the cathode was modified to 50°. The electric arc was operated under an atmosphere of $H_2$ using 150 A, dc. The distance between the electrodes remained ~2 mm, and the reaction time was typically 3 minutes. The product obtained was a rope-like, film-like and web-like substance with a total weight of 165 mg.

EXAMPLE 4

The apparatus used is shown in FIG. 1.

2.0 g of reactants containing 2.6 at % Ni, 1.0 at % Y, 0.75 at % FeS and 95.65 at % graphite powder were filled into a hole on the upper surface of the anode cylinder. The angle between the anode and the cathode was modified to 50°. The electric arc was operated under an atmosphere of $H_2$ using 150 A, dc. The distance between the electrodes remained ~2 mm, and the reaction time was typically 3 minutes. The product obtained was a rope-like, film-like and web-like substance with a total weight of 175 mg.

EXAMPLE 5

The apparatus used is shown in FIG. 1.

2.0 g of reactants containing 2.6 at % Ni, 1.0 at % Fe, 0.75 at % FeS and 95.65 at % graphite powder were filled into a hole on the upper surface of the anode cylinder. The angle between the anode and the cathode was modified to 50°. The electric arc was operated under an atmosphere of $H_2$ using 150 A, dc. The distance between the electrodes remained ~2 mm, and the reaction time was typically 3 minutes. The product obtained was a rope-like, film-like and web-like substance with a total weight of 160 mg.

EXAMPLE 6

The apparatus used is shown in FIG. 1.

2.0 g of reactants containing 2.6 at % Ni, 0.7 at % Fe, 0.7 at % Co, 1.0 at % S and 95 at % graphite powder were filled into a hole on the upper surface of the anode cylinder. The angle between the anode and the cathode was modified to 50°. The electric arc was operated under an atmosphere of $H_2$ using 150 A, dc. The distance between the electrodes remained ~2 mm, and the reaction time was typically 3 minutes. The product obtained was a rope-like, film-like and web-like substance with a total weight of 170 mg.

EXAMPLE 7

The apparatus used is shown in FIG. 1.

2.0 g of reactants containing 2.6 at % Ni, 0.7 at % Fe, 0.7 at % Co, 0.75 at % FeS and 94.95 at % graphite powder were filled into a hole on the upper surface of the anode cylinder. The angle between the anode and the cathode was modified to 50°. The electric arc was operated under a mixed atmosphere of $H_2$ (200 torr) and Ar (50 torr) using 150 A, dc. The distance between the electrodes remained ~2 mm, and the reaction time was typically 3 minutes. The product obtained was a rope-like, film-like and web-like substance with a total weight of 170 mg.

EXAMPLE 8

The apparatus used is shown in FIG. 1.

2.0 g of reactants containing 2.6 at % Ni, 0.7 at % Fe, 0.7 at % Co, 0.75 at % FeS and 95.25 at % graphite powder were filled into a hole on the upper surface of the anode cylinder. The angle between the anode and the cathode was modified to 50°. The electric arc was operated under an atmosphere of $H_2$ using 150 A, dc. The distance between the electrodes remained ~2 mm, and the reaction time was typically 3 minutes. The product obtained was a rope-like, film-like and web-like substance with a total weight of 175 mg.

EXAMPLE 9

The apparatus used is shown in FIG. 1.

2.0 g of reactants containing 2.6 at % Ni, 0.7 at % Fe, 0.7 at % Co, 0.75 at % FeS and 95.25 at % graphite powder were filled into a hole on the upper surface of the anode cylinder. The angle between the anode and the cathode was modified to 50°. The electric arc was operated under a mixed atmosphere of $H_2$ (200 torr) and Ar (50 torr) using 150 A, dc. The distance between the electrodes remained ~2 mm, and the reaction time was typically 3 minutes. The product obtained was a rope-like, film-like and web-like substance with a total weight of 167 mg.

EXAMPLE 10

The apparatus used is shown in FIG. 1.

Totally, 10 g of reactants were filled in five holes on the upper surface of the anode cylinder, such that 2.0 g of reactants were filled into each hole with the proportion of 2.6 at % Ni, 0.7 at % Fe, 0.7 at % Co, 0.75 at % FeS and 95.25 at % graphite powder. The angle between the anode and the cathode was modified to 50°. The electric arc was operated under an atmosphere of $H_2$ using 150 A, dc. The distance between the electrodes remained ~2 mm. The reaction time was typically 3 minutes for each hole, and then the buffer gas was changed to discharge the reactant in the next hole. The total reaction time was 30 minutes. The product obtained was a rope-like, film-like and web-like substance with a total weight of 940 mg.

EXAMPLE 11

Figure 2:
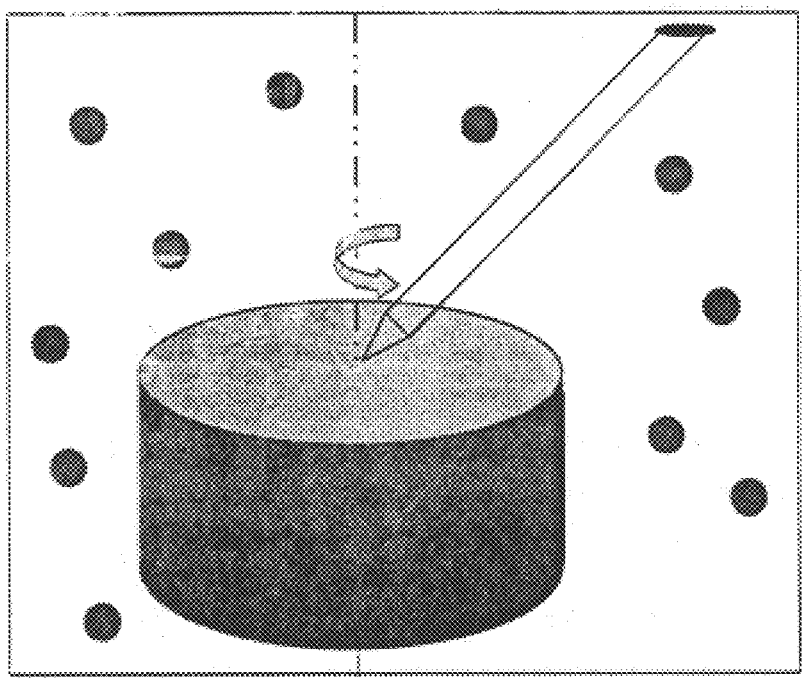
FIG. 2 is a schematic diagram of another apparatus used for sythesizing SWNTs in large scale by a semi-continuous hydrogen arc discharge method (in this apparatus, the reactants are pressed into cylinder target as part of the anode directly)
Figure 3:
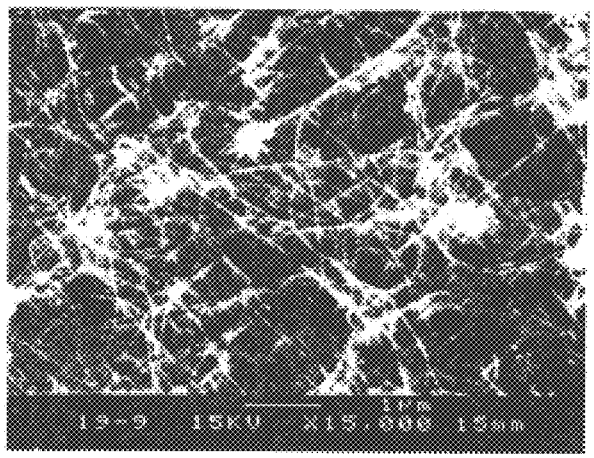
FIG. 3 is an SEM image of the SWNTs prepared by the hydrogen arc discharge method.
Figure 4:
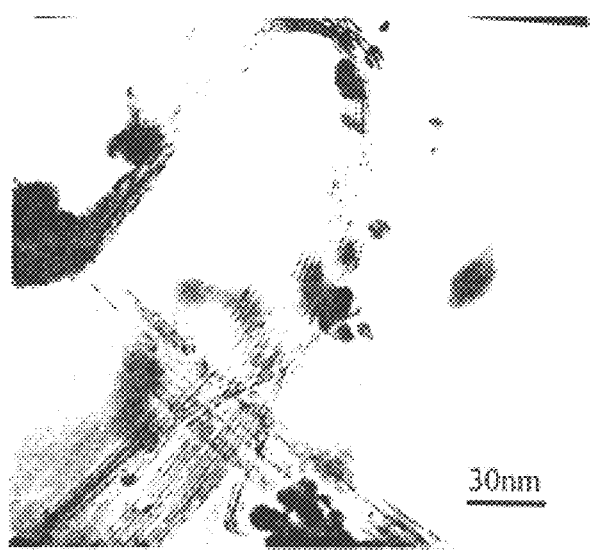
FIG. 4 is a TEM image of the SWNTs prepared by the hydrogen arc discharge method.
Figure 5:
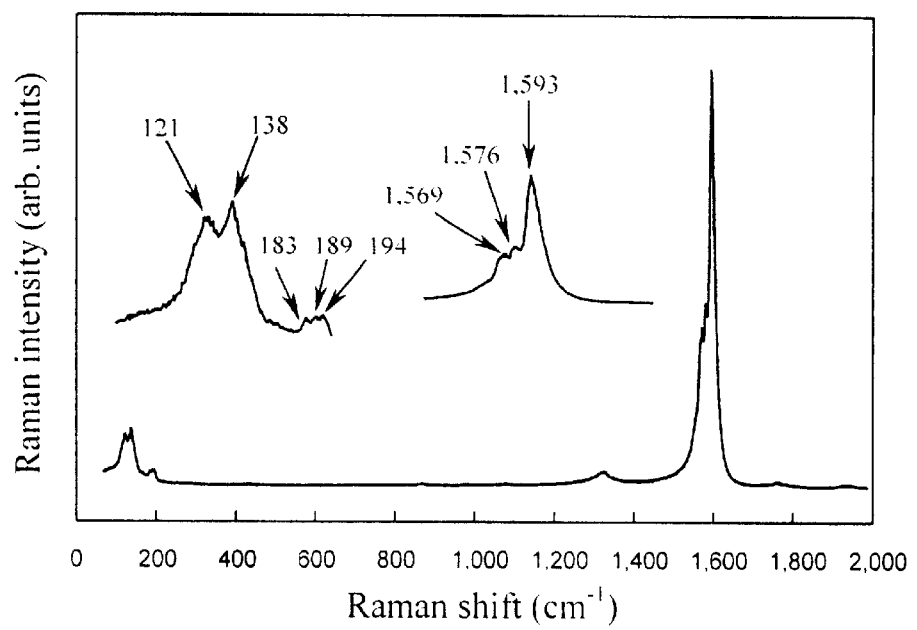
FIG. 5 is a Raman spectrum of the SWNTs prepared by the hydrogen arc discharge method.

The apparatus used is shown in FIG. 2.

A homogeneous mixture of 2.6 at % Ni, 0.7 at % Fe, 0.7 at % Co, 0.75 at % FeS and 95.25 at % graphite powder was model-pressed into a cylinder shape to act as the anode. The angle between the anode and the cathode was modified to 50°. The electric arc was operated under an atmosphere of $H_2$ using 150 A, dc. The distance between electrodes remained ~2 mm. The reaction time was typically 3 minutes and then the buffer gas was changed and the anode was rotated to discharge the reactant in another part of the anode cylinder. The total reaction time was 30 minutes. The product obtained was a rope-like, film-like and web-like substance with a total weight of 980 mg.

EXAMPLE 12

Figure 6:
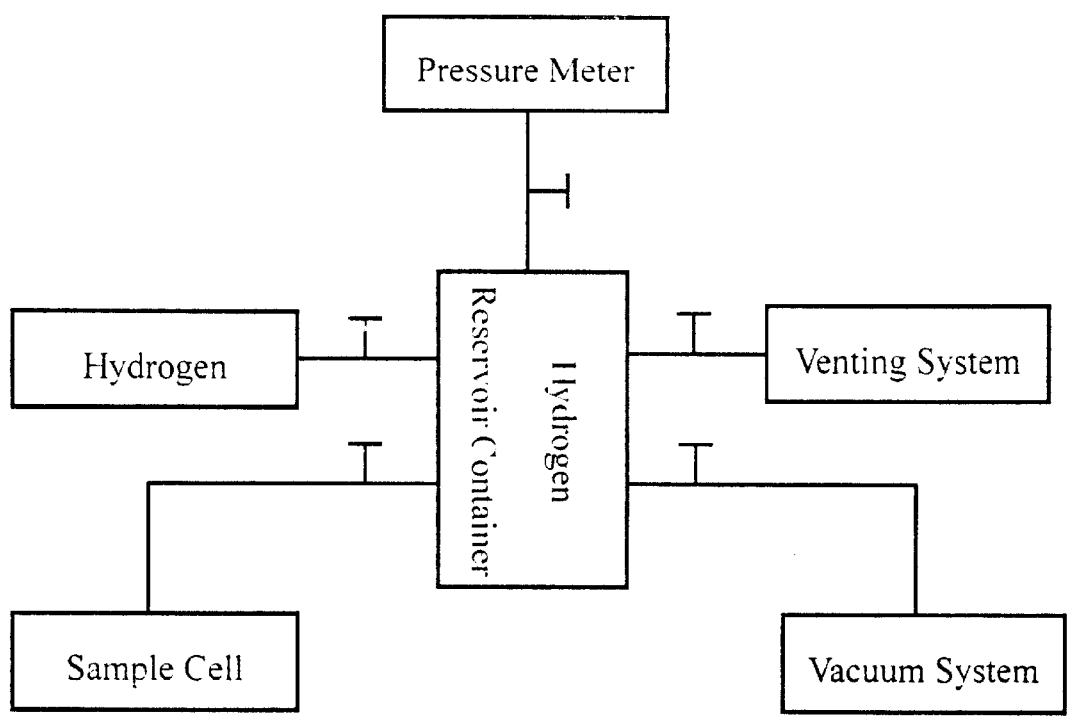
FIG. 6 is a schematic diagram of the apparatus used for testing the hydrogen storage capacity of SWNTs.

The apparatus used is shown schematically in FIG. 6.

The as-prepared SWNTs of ~600 mg were soaked in 37% HCl acid for 48 hours, rinsed by de-ionized water and then dried in an oven. After being weighed accurately, the sample was put into the sample cell as shown in FIG. 6 to undergo vacuum for 5 hours under the condition of 150° C. Then the hydrogen storage capacity of SWNTs was measured at moderate high pressure (100~120 atm) and room temperature. The hydrogen storage capacity of the SWNTs tested was determined to be 4.02 wt %.

EXAMPLE 13

The apparatus used is shown schematically in FIG. 6.

The as-prepared SWNTs of ~600 mg were soaked in 37% HCl acid for 48 hours, rinsed by de-ionized water and then dried in an oven. The sample obtained was further vacuum heat-treated at 500° C. for 2 hours. After being weighed accurately, the sample was put into the sample cell as shown in FIG. 6 to undergo vacuum for 5 hours under the condition of 150° C. Then the hydrogen storage capacity of the SWNTs was measured at moderate high pressure (100~120 atm) and room temperature. The hydrogen storage capacity of the SWNTs tested was determined to be 4.58 wt %.

EXAMPLE 14

The apparatus used is shown schematically in FIG. 6.

The as-prepared SWNTs of ~600 mg were vacuum heat-treated at 400° C. for 2 hours. After being weighed accurately, the sample was put into the sample cell as shown in FIG. 6 to undergo vacuum for 5 hours under the condition of 150° C. Then the hydrogen storage capacity of the SWNTs was measured at moderate high pressure (100~120 atm) and room temperature. The hydrogen storage capacity of the SWNTs tested was determined to be 4.24 wt %.

What is claimed is:

1. A method for producing a single-walled carbon nanotube product comprising:
   providing an anode at least a portion of which includes graphite powder, catalyst metal, and a growth promoter in an atmosphere containing hydrogen;
   providing a cathode in the atmosphere; and
   inducing an electric arc across the anode and cathode to thereby consume the anode and produce the single-walled carbon nanotube product, wherein the growth promoter is selected from the group consisting of sulfur and a solid sulfide;
   soaking the single-walled carbon nanotube product in an acid or an oxidative reactant; and
   heating the soaked single-walled carbon nanotube product under vacuum to produce a hydrogen storage material.

2. The method according to claim 1, wherein the cathode is a movable graphite rod.

3. The method according to claim 1, wherein the anode includes a cylinder pressed from a mixture of evenly dispersed graphite powder, catalyst metal, and growth promoter.

4. The method according to claim 1, wherein the anode includes a graphite cylinder with at least one hole defined in its top surface, wherein the hole includes evenly dispersed graphite powder, catalyst metal, and growth promoter.

5. The method according to claim 1, wherein the anode is a cylinder pressed from the graphite powder, the catalyst metal, and the growth promoter under a pressure of 10 MPa.

6. The method according to claim 1, wherein the anode is rotatable.

7. The method according to claim 1, wherein the atmosphere is selected from the group consisting of pure hydrogen and a mixture of at least 80% hydrogen and 20% argon by volume.

8. The method according to claim 1, wherein the catalyst metal includes at least two metals selected from the group consisting of Fe, Co, Ni, and Y.

9. The method according to claim 1, wherein the catalyst metal is present in the anode in an amount of 2.5 to 5 atom percent.

10. A method for producing a single-walled carbon nanotube product comprising:
    providing an anode at least a portion of which includes graphite powder, catalyst metal, and a growth promoter in an atmosphere containing hydrogen;
    providing a cathode in the atmosphere; and
    inducing an electric arc across the anode and cathode to thereby consume the anode and produce the single-walled carbon nanotube product, wherein the growth promoter is selected from the group consisting of sulfur and a solid sulfide;
    wherein the cathode and a top surface of the anode are arranged at an angle with respect to one another of from 30° to 80°.

11. A method for producing a single-walled carbon nanotube product comprising:
    providing an anode at least a portion of which includes graphite powder, catalyst metal, and a growth promoter in an atmosphere containing hydrogen;
    providing a cathode in the atmosphere; and
    inducing an electric arc across the anode and cathode to thereby consume the anode and produce the single-walled carbon nanotube product,
    wherein the growth promoter is selected from the group consisting of sulfur and a solid sulfide;
    wherein the anode has a first diameter, the cathode has a second diameter smaller than the first diameter, and wherein a ratio of the first diameter to the second diameter is from 10 to 20.

12. A method for producing a single-walled carbon nanotube product comprising:
    providing an anode at least a portion of which includes graphite powder, catalyst metal, and a growth promoter in an atmosphere containing hydrogen;
    providing a cathode in the atmosphere; and
    inducing an electric arc across the anode and cathode to thereby consume the anode and produce the single-walled carbon nanotube product, wherein the growth promoter is selected from the group consisting of sulfur and a solid sulfide;
    wherein, in the step of inducing the electric arc, a direct current of 100 to 150 amps dc is applied to thereby create a plasma.

13. A method for producing a single-walled carbon nanotube product comprising:
    providing an anode at least a portion of which includes graphite powder, catalyst metal, and a growth promoter in an atmosphere containing hydrogen;
    providing a cathode in the atmosphere; and
    inducing an electric arc across the anode and cathode to thereby consume the anode and produce the single-walled carbon nanotube product, wherein the growth promoter is selected from the group consisting of sulfur and a solid sulfide;

wherein the growth promoter is present in the portion of the anode in an amount of 0.5 to 1 atom percent.

14. The method according to claim 1, wherein the acid is a member selected from the group consisting of 20–65% $HNO_3$ and 10–37% HCl.

15. The method according to claim 1, wherein the product is soaked for 24 to 48 hours.

16. The method according to claim 1, wherein the heating temperature is in a range from 400° C. to 1200° C.

17. The method according to claim 1, wherein the heating lasts for 2 to 4 hours in vacuum.

18. The method according to claim 1, wherein the hydrogen storage material has a hydrogen adsorption capacity higher than 3% by weight.

* * * * *